(12) United States Patent
Fedorocko et al.

(10) Patent No.: US 11,461,337 B2
(45) Date of Patent: Oct. 4, 2022

(54) ATTRIBUTE ANNOTATION FOR RELEVANCE TO INVESTIGATIVE QUERY RESPONSE

(71) Applicant: Workday, Inc., Pleasanton, CA (US)

(72) Inventors: Peter Fedorocko, Prague (CZ); Filip Dousek, Prague (CZ); Viktor Brada, Třinec (CZ); Hynek Walner, Hlincová Hora (CZ)

(73) Assignee: Workday, Inc., Pleasanton, CA (US)

( * ) Notice: Subject to any disclaimer, the term of this patent is extended or adjusted under 35 U.S.C. 154(b) by 796 days.

(21) Appl. No.: 16/228,684

(22) Filed: Dec. 20, 2018

(65) Prior Publication Data

US 2020/0201866 A1    Jun. 25, 2020

(51) Int. Cl.
*G06F 16/00*    (2019.01)
*G06F 16/2457*    (2019.01)
*G06F 16/22*    (2019.01)
*G06F 16/242*    (2019.01)
*G06F 40/30*    (2020.01)

(52) U.S. Cl.
CPC .... *G06F 16/24573* (2019.01); *G06F 16/2264* (2019.01); *G06F 16/243* (2019.01); *G06F 40/30* (2020.01)

(58) Field of Classification Search
None
See application file for complete search history.

(56) References Cited

U.S. PATENT DOCUMENTS

2013/0262501 A1* 10/2013 Kuchmann-Beauger ..................
            G06F 16/9024
            707/769
2018/0373753 A1* 12/2018 Flaks .................... G06F 16/243

* cited by examiner

*Primary Examiner* — Thu Nguyet T Le
(74) *Attorney, Agent, or Firm* — Van Pelt, Yi & James LLP

(57) ABSTRACT

A method and system for annotating attributes for use in responding to queries and using the annotated attributes. In one aspect, a dataset is annotated with attributes in predefined categories using a processor. Also using the processor, question templates are provided based on attributes. Each of the plurality of question templates corresponds to at least one query for the dataset. In another aspect, the method and system include receiving a question including a question template selected from predetermined question templates. In this aspect, the method and system also include mapping, using the processor, the question to at least one attribute of the plurality of attributes in the plurality of predefined categories and to at least one pattern for the at least one attribute.

21 Claims, 5 Drawing Sheets

ATTRIBUTE ANNOTATION FOR RELEVANCE TO INVESTIGATIVE QUERY RESPONSE

BACKGROUND OF THE INVENTION

Datasets for an organization can be extremely large and contain a wide variety of information. Such a dataset can include human resource, corporate, financial, legal, vendor, customer, product, income, medical, and other records corresponding to past, current and future activities of the organization. Increasingly, identifying, processing, and analyzing such datasets is important to the health and growth of an organization. In order to extract meaning from the datasets, structured query language (SQL) queries are typically used. Although such queries can provide access to the data, the ability of the queries to be abstracted to questions that are important to users is limited. For example, an analyst or other typical user may have difficulty in crafting a set of SQL queries that will provide data in a format that allows a user to answer relatively simple questions relating to trends or other aspects of the organization. Even individuals with expertise in SQL may have difficulty in obtaining the desired information from the dataset. As a result, an organization may be forced to expend resources in order to obtain desired information from the datasets and/or may miss opportunities a better understanding of the data presents. Accordingly, a technique for improving a user's ability to adequately mine datasets is desired.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method and system for annotating attributes for use in responding to queries and using the annotated attributes. In one aspect, a dataset is annotated with a plurality of attributes in a plurality of predefined categories using a processor. Also using the processor, a plurality of question templates are provided based on the plurality of attributes. Each of the plurality of question templates corresponds to at least one query for the dataset. In another aspect, the method and system include receiving a question including a template selected from the plurality of predetermined question templates. In this aspect, the method and system also include mapping, using the processor, the question to at least one attribute of the plurality of attributes in the plurality of predefined categories and to at least one pattern for the at least one attribute.

Figure 1A:
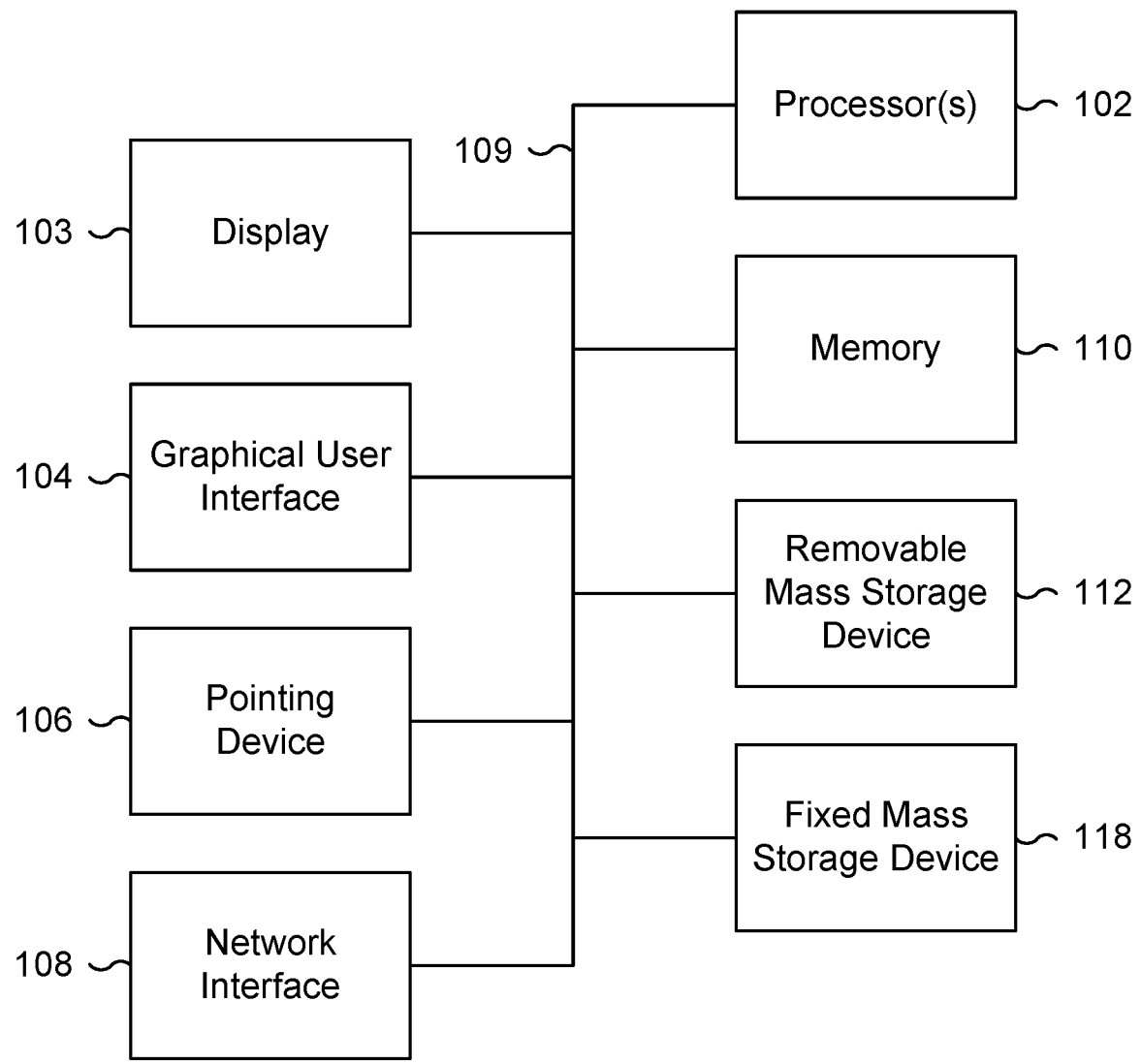
FIG. 1A is a block diagram of one embodiment of a computer system used in annotating attributes for providing query responses that have improved relevance.

FIG. 1A is a block diagram of one embodiment of a computer system 100 usable in annotating attributes to provide query responses having improved relevance. Other computer system architectures and configurations can be used for carrying out the processing of the disclosed technique. Computer system 100, made up of various subsystems described below, includes at least one microprocessor subsystem (also referred to as a central processing unit, or CPU) 102. For example, processor 102 can be implemented by a single-chip processor or by multiple processors. Processor 102 may have multiple cores in some embodiments. In some embodiments processor 102 is a general purpose digital processor which controls the operation of the computer system 100. Using instructions retrieved from memory 110, processor 102 controls the reception and manipulation of input data, and the output and display of data on output devices. In some embodiments, processor 102 includes and/or is used to provide functions described below with respect to system 150 of FIG. 1B and methods 210, 230 and 250.

Processor 102 is coupled bi-directionally with memory 110 which can include a first primary storage, typically a random access memory (RAM), and a second primary storage area, typically a read-only memory (ROM). Primary storage can be used as a general storage area and as scratch-pad memory, and can also be used to store input data and processed data. Primary storage can also store programming instructions and data, in the form of data objects and text objects, in addition to other data and instructions for processes operating on processor 102. Primary storage typically includes basic operating instructions, program code, data and objects used by processor 102 to perform its functions (e.g., programmed instructions). For example, memory 110 may include any suitable computer-readable storage media, described below, depending on whether, for example, data access needs to be bi-directional or uni-directional. Processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. Storage device 112 may also include computer-readable media such as magnetic tape, flash memory, signals embodied on a carrier wave, PC-CARDS, portable mass storage devices, holographic storage devices, and other storage devices. A fixed mass storage device 118 can also provide additional data storage capacity. The most common example of mass storage is a hard disk drive. Mass storage devices at 112 and 118 generally store additional programming instructions, data, and the like that typically are not in active use by processor 102. It will be appreciated that the information retained within mass storage devices 112 and 118 may be incorporated, if needed, in standard fashion as part of memory 110 (e.g. RAM) as virtual memory.

In addition to providing processor 102 access to storage subsystems, bus 109 can be used to provide access other subsystems and devices as well. In the described embodiment, these can include a display 103, a graphical user interface 104, a pointing device 106, and a network interface 108, as well as an auxiliary input/output device interface, a sound card, speakers, and other subsystems as needed. The pointing device 106 may be a mouse, stylus, track ball, or tablet, and is useful for interacting with graphical user interface 104.

The network interface 108 allows processor 102 to be coupled to another computer, computer network, or telecommunications network using a network connection as shown. Through the network interface 108, it is contemplated that the processor 102 might receive information (e.g., data objects or program instructions) from another network, or might output information to another network in the course of performing the above-described method steps. Information, often represented as a sequence of instructions to be executed on a processor, may be received from and outputted to another network, for example, in the form of a computer data signal embodied in a carrier wave. An interface card or similar device and appropriate software implemented by (e.g. executed or performed on) processor 102 can be used to connect computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) may also be connected to processor 102 through network interface 108.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the disclosed technique further relate to computer storage products with a computer readable medium that contains program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 1A is but an example of a computer system suitable for use with the various embodiments disclosed herein. Other computer systems suitable for such use can include additional or fewer subsystems. In addition, bus 109 is illustrative of any interconnection scheme serving to link the subsystems. Other computer architectures having different configurations of subsystems can also be utilized.

Figure 1B:
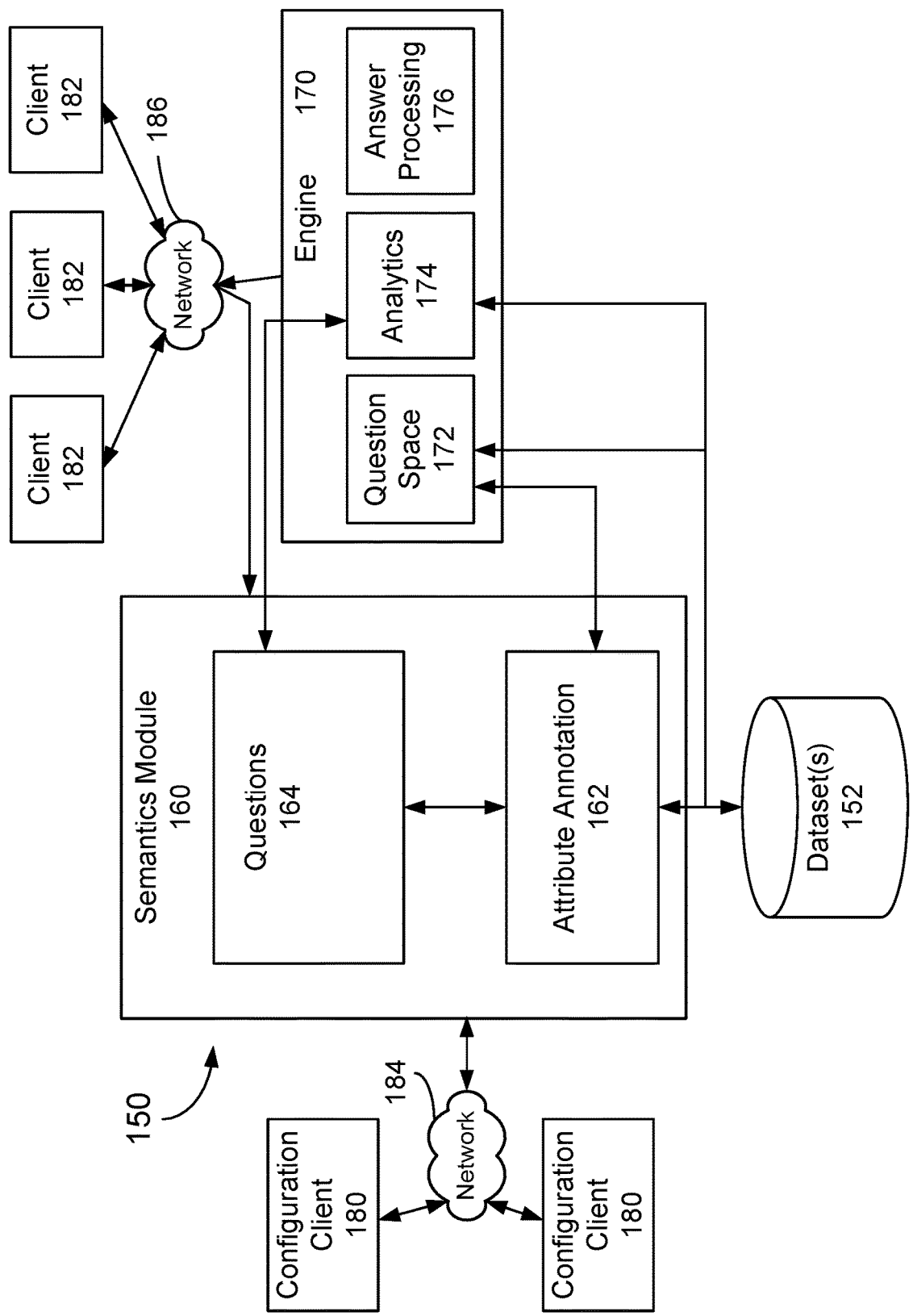
FIG. 1B is a block diagram of the architecture of one embodiment of a system for annotating attributes to provide query responses having improved relevance.

FIG. 1B is a block diagram of the architecture of one embodiment of a system 150 for annotating attributes to provide query responses having improved relevance. Also shown are clients 180 and 182 connected to system 150 via networks 184/186. A client can be a laptop computer, a desktop computer, a tablet, a mobile device, a smart phone, a wearable networking device, or any other appropriate computing device. Users of clients 180 access system 150 for annotating dataset 152. Users of clients 182 utilize system 150 for answering questions using the dataset 152. Although different clients 180 and 182 are shown as accessing system 150 for annotating and using dataset 152, the same client and/or user may perform both functions. Network 184/186 can be the Internet, a private network, a hybrid network, or any other communications network. Although depicted separately, networks 184 and 186 may be part of a single network.

System 150 includes semantics module 160, engine 170 and storage including one or more datasets 152. Semantics module 160 and engine 170 may be implemented using processor 102. Dataset 152 includes data related to an organization and may be in an online analytical processing (OLAP) cube or other format. For example, dataset 152 may include sales, purchasing, other financial data, human resources, legal, organizational and/or other data which users of clients 180 and/or 182 desire to use in answering questions related to the activities in which owner of system 150 is engaged. Although referred to hereinafter in singular form, dataset 152 may contain multiple datasets.

Semantics module 160 is used to translate between the particular questions desired to be answered by users of clients 182 and queries, such as SQL queries, used to interrogate dataset 152. Stated differently, semantics module 160 may be seen as a level of abstraction between code used in connection with dataset 152 and the understanding of users of clients 182. To perform this abstraction function, semantics module 160 annotates dataset 152 with attributes and provides templates usable in higher level questions of interest to users. Consequently, semantics module 160 may be viewed as including one or more libraries of attributes, patterns, routines, templates and other information utilized in translating between questions and dataset queries. These libraries may be included in attribute annotation 162 and questions 164. Attribute annotation 162 include attributes (described below) in particular categories with which dataset 152 has been annotated. Such categories are related to the activities in which users of clients 180 and/or 182 are engaged or interested in. Questions 164 includes question templates (hereinafter templates) for the natural language questions, the patterns indicating the relationship between metrics for the question, corresponding database queries and methods/routines usable by engine 170 in answering the questions. Questions 164 includes preset templates and configurable templates. Configurable templates are used in questions based that are at least partially configurable by users of clients 182. Configurable templates include particular patterns or attributes, to provide questions that the users of clients 182 have customized. For example, one such configurable template may be: "How does {{measure1}} compare with the plan for {{time1}} for {{dimension1}}?" The user of client 182 may select a measure such as "diversity", "headcount" or "revenue" for measure1; a time interval such as "current quarter", "previous quarter", "current year" for time1; and a location, department or the entire company for dimension1. The resulting questions might be "Where is headcount behind the plan for last quarter for the legal department?" Engine 170, described below, might return answers such as "For the legal department, headcount is behind the plan for last quarter in Intellectual Property Counsel jobs."; "For the legal department, HC is behind the plan for last quarter in Chicago." or "For the legal department, HC is behind the plan for last quarter in senior positions with >7 years of experience." Other, more complex questions may also be configured in an analogous manner and answered by engine 170. Preset templates correspond to preset questions that may be selectable from a menu and include attributes, patterns and other features that have been set. Thus, preset question are selectable, but not configurable by users of clients 182. Questions 164 may provide templates for both general questions and questions that are specific to an industry, department or other category.

Engine 170 may be used to process questions. Engine 170 includes question space 172, analytics 174 and answer processing 176. Question space 172 uses attributes and other information to narrow the space in dataset 152 investigated by the operations provided by semantics module 160. Analytics 174 provides queries, such as SQL queries, to dataset 152. Analytics 174 also receives information from dataset 152 in response to the queries and performs any additional processing to provide a number of possible answers to the question including templates. Answer processing 176 may filter, rank or further reduce and order the responses to the question. In so doing, answer processing 176 may also utilize attributes provided by semantics module 160. Answer processing 176 returns the final answer(s) to clients 182.

Figure 2:
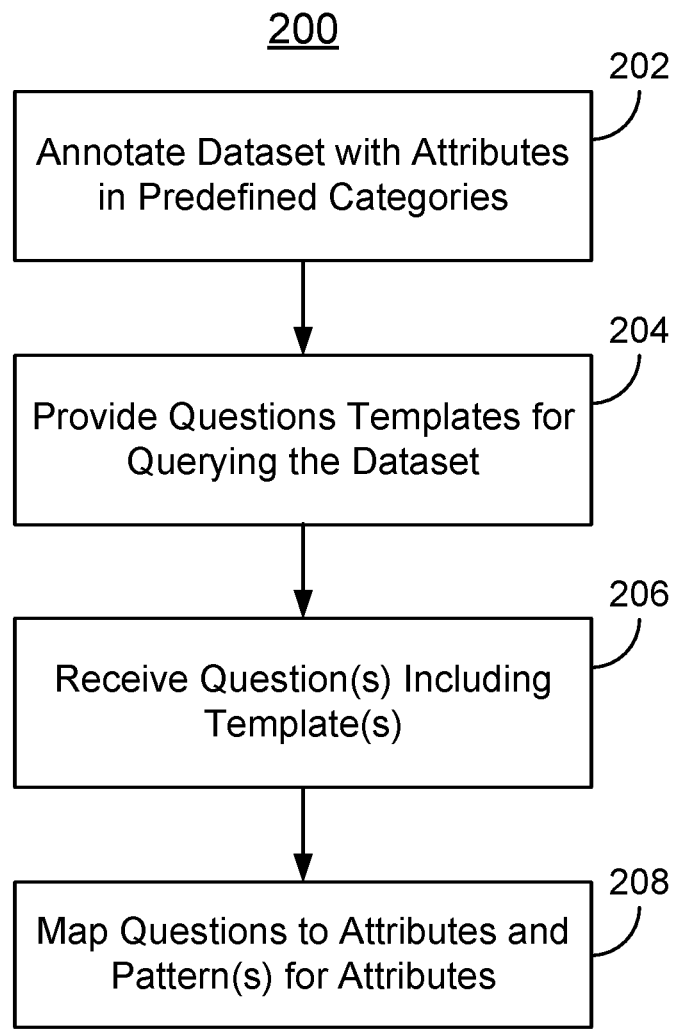
FIG. 2 is a flow chart depicting an exemplary embodiment of a method for annotating a dataset with attributes and mapping a question corresponding to the attributes.

FIG. 2 is a flow chart depicting an embodiment of method 200 for annotating a dataset with attributes and mapping a question corresponding to the attributes. Method 200 may be performed using processor(s) 102 executing instructions from memory 110. Method 200 is described in the context of the system 150. However, method 200 may be executed using another system.

Dataset 152 is annotated with attributes that are in a number of predefined categories using semantics module 160, at 202. Annotation of dataset 152 may include selections made or information provided by users of configuration clients 180 as well as information automatically obtained by querying dataset 152. Both the measures in dataset 152 and the dimensions are annotated. The predefined categories are selected to further describe the dimensions and measures, to be able to map relationships between dimensions and measures, to designate features that may be more important to users of clients 180 (e.g. associated with a particular industry, organization, department or job) and to denote how operations/queries are performed on the measure. In some embodiments, the predefined categories include: semantics, relations, business properties and mathematics.

The semantics category indicates the type of measure or dimension. For example, a dimensional type attribute may be "country", "city" or "department" (type of location) or product and product category (type of product). A measure type attribute may be "revenue" or "profit" (types of income).

The relations category expresses the relationship between measures or dimensions. A dimensional relation attribute includes hierarchies (e.g. a location hierarchy including in descending order of size "continent", "country", "region", "city", and "department"). A measure relation attribute indicates the relationship between measures, for example, how one measure influences or causes a change in another measure. Thus, the interrelationships between measures can be defined. For example, the revenue may be the number of units sold multiplied by the price per unit. The "units sold" measure explains/influences "revenue" measure. Similarly, the "number of customers" measure influences/explains "units sold" measure in that a lower number of customers may result in fewer units sold and, therefore, lower revenue. The relationships between measures can, therefore, be mapped using measure relation attributes.

The business property category indicates how the dimension or measure is organized in, perceived by or affects the particular organization using system 150. The business property category also indicates the types of actions engine 170 may take when making queries and providing answers using a dimension or measure. The dimension business property attribute might include, for example, "explanation-only", "explanation-by-subset" and "responsibilities". An "explanation-only" attribute for a dimension indicates that answers localized to that dimension are not presented to the user of client 180. Instead, the dimension may only be used to explain or provide further meaning to answers localized to other dimension(s). An "explain-by-subset" attribute of a dimension limits the possible combinations queried by assigning the dimension only to combinations containing selected dimensions. The "explain-by-subset" thus may limit the space in dataset 152 interrogated. For example, "city" can be set to be in the "explain-by-subset" attribute for the "country" dimension. That means "country" will be analyzed in combination with all other dimensions (e.g. "product", "size", etc.). However, the "city" dimension is analyzed only in the combinations that contain also the "country" dimension. In the example above, some combinations that could be analyzed include: ("country"), ("country", "city"), ("country", "size), ("country", "city", "size"). Combinations that would not be used include: ("city"), ("city", "size"). A "responsibilities" attribute indicates that answers containing a particular element are assigned to a specific user (e.g. if an answer relates to A, the answer is provided to employee B). Responsibilities can be assigned to intersections of multiple dimensions (e.g. if an answer relates to A and D, the answer is assigned to employee C). Further, if multiple responsibilities that can overlap between users are specified, a priority is also designated. The measure business properties attribute might include, for example, "suitable-for-leaderboard", "expression", "sentiment" and "dimension-limitation". A "suitable-for-leaderboard" attribute for a measure indicates that the measure might be used by the organization to make comparisons, for examples between different locations/branches and/or between different managers. Further, system 150 automatically constructs leaderboards by values of this measure on various levels of aggregation for dataset 152. An "expression" attribute allows the exact definition of (formula for) the measure to be provided. This may be used to omit preprocessing. For example, an expression attribute for margin may be "margin=revenue−cost". The "expression" is provided for measures that are non-additive and/or non-symmetric as defined below. In some embodiments, the "expression" may also be provided for additive and/or symmetric measures, as desired. Such measures are not easily aggregated from input data sources to various levels of aggregation using basic sums, averages or similar operations. For example, a market share (hereinafter "share") measure is not easily aggregated and cannot be precomputed because the share changes for different group bys. Thus, the share for a department in a particular city depends upon whether the share of the department is being derived from the city (group by all departments at the city) or from all such departments (group by the department across all the locations). The sentiment attribute indicates whether a reduction in the measure is positive, negative or neutral for the organization. For example, a decrease in income is negative, while a decrease in costs to make goods is generally positive. A "dimension limitations" attribute for a measure reduces the data space that is analyzed to answer a question. The "dimension limitations" specifies one or more dimension combinations to be analyzed for the measure.

The mathematics category indicates the mathematical properties of a measure, such as whether a measure is symmetric and/or additive. A measure that is additive is such that the sum of the elements for the measure results in a correct total value. For example, the number of employees per location in a country sums to all of the employees in the country. Thus, the number of employees is additive. In contrast, the average revenue per location may not sum to the average revenue for all locations in the country. Thus, average revenue is not additive. A measure is symmetric if the order of group by and filter in SQL queries does not change the result. For example, if a set of queries sums the sales per day for a location, the order of the days may be changed without changing the sum. Such measures are symmetric. In contrast, measures such as share are not symmetric. For example, the two operations: sum of sales of department A in location B and sum of sales in the location B for department A result in the same number. Thus, as mentioned above, the sum is symmetric. The share of sales of department A for location B indicates how department A is doing among the departments that have some presence at location B. The share of sales of location B for department A indicates how location B is doing among other locations filtered only to sales originating in department A. The share of department A for location B results in a different number than the share of location B for department A. Thus, share is not symmetric.

Templates for the questions are provided, at 204. Templates correspond to business questions that users of clients 182 might desire to be answered. Templates, or hypotheses, are associated with the dimensions, measures and attributes for the questions as well as patterns. Patterns include relationships for the data including but not limited to trends, comparisons between dimensions or measures, convergences, divergences, deviations (e.g. from a plan, average or other target), thresholds, correlations, causations, regressions, similitudes, anomalies and clusters. Examples of trends include increases in costs over time and continued loss of key personnel. Comparisons may include similarities between actual data and a plan or between two locations. Convergences, divergences and deviations measure differences between the measures or dimensions and a target as well as how such differences change.

Also at 204, the queries and other operations that are mapped to the template and used to interrogate dataset 152 are provided. For example, sets of SQL queries that will be used by engine 170 to access dataset 152 and routines that may be used to compare results of the SQL queries may be provided. Templates provided at 204 include information specific to the activities of interest to users of clients 182 as well as general information that may be important to many organizations. As discussed above, templates may be fixed or configurable by a user to form the questions. Because templates are configurable, the variety of questions that can be obtained using the templates may be greatly increased. For example, questions provided using templates generated at 204 include but are not limited to the following:

Sales questions such as: "Are we losing key customers?", "What are the most significant trends in our sales?", "Is our customer acquisition slowing down?", "Which segments of the assortment are not selling as they used to?", "Is there a slow death of products, categories, stores, regions?", "What are the underlying trends in our average basket size?", "Where do we have sales drop-outs?", "Are we losing customers of a specific product?", "What kind of customers are we losing?", "Where can a specific store improve?", "Where can a specific sales representative improve?"

Market benchmark questions such as: "Where are we growing slower than our competitors?", "Where are we beating our competitors?", "Where did we increase our share?"

General questions such as: "Where has the long-term trend changed?", "Where has the short-term trend changed?", "What are the key downward trends?"

Product management questions such as: "What product launches didn't go well, and why?", "Do we have products cannibalizing each other?", "Do we have categories cannibalizing each other?"

Finance questions such as: "Where is the margin falling?", "Where are we falling behind the plan?", "What are the high potential areas?", "What are the key trends underlying our cash flow?", "What are the key trends in our profitability?"

Human capital management questions such as "What are the key trends in our workforce diversity?", "What can we do to increase the diversity of the organization?", "Where should we focus to improve diversity?", "Where in our organization is the average tenure dropping?", "Who are our high-performers?", "Where are we losing our high-performers?", "How can we improve employee engagement?", "Where did our employee engagement drop in the last quarter?" "Which hiring manager has the highest ability to hire?", "Where can a certain hiring manager improve?", "What will our skills gap be next year?", "Where are we behind our hiring plan?", "How has our organizational composition changed year over year?"

Specific questions such as: Are there any significant changes in customer RFM segments? What are the major drivers of customer (dis)satisfaction (NPS)?

Hiring questions such as: "Which phases of the hiring process are the greatest bottleneck?", "Are internal referral programs bringing high or low quality candidates?"

Retention/attrition questions such as: "Where is the rate of regrettable terminations the highest?", "is the attrition coming from different groups?" "What are the key trends underlying our overall attrition?"

As is indicated by the questions above, many of the questions may be configured from a template similar to "How is {{measure1}} {{change}} over {{time}} ?" where measure1 may be sales of a product, revenue, margin, number of particular employees or other measure; change may be increasing, decreasing, increasing/decreasing by at least a threshold; and time may be a day, a quarter, a year or several years. Thus, a single template may result in a large number of meaningful questions. Others of the questions above, and the corresponding templates, might be preset.

In general, annotation of dataset 152 at 202 and formation of templates at 204 involves the input from experts in the relevant fields via clients 180. For example, creator of dataset 152, analysts in the field corresponding to dataset 152, and engineers that design the algorithms may assist in annotation and template formation. In some embodiments, 202 and 204 may be performed to configure dataset 152 for use. In addition, 202 and 204 may be periodically performed again to update annotations to dataset 152 to reflect trends or changes in the questions desired to be answered by users of clients 182. Thus, although occurring before 206 and 208, 202 and 204 may not be otherwise temporally linked to 206 and 208. Stated differently, 202 and 204 may occur at configuration of dataset 152, while 206 and 208 occur at runtime.

Questions are received from clients 182, at 206. The questions received include templates provided at 204. Measures, attributes, and patterns that are selected by the user when configuring the template to form the question are also received. Although provided to the user in natural language format, system 150 may use the question in another format. For example, the question configured by the user may be "How did revenue change over the past quarter?" System 150 may use the template "How did {{measure1}} {{change}} over {{time}} ?" with an indication that measure1 is revenue, change is the pattern and time is the last two quarters (to obtain a change). Thus, the questions are mapped to the attribute(s) and pattern(s) indicated in the template, at 208. Mapping in 208 includes not only transforming a natural language question to the corresponding template indicating the dimensions, measures, attributes and patterns but also determining the operations associated with the template. To perform this mapping, semantics module 160 may access libraries in questions 164 and attribute annotation 162 to obtain the appropriate templates, routines, attributes and patterns. Using this mapping, engine 170 may access the appropriate portions of dataset 152, limit the investigation to the desired space, perform analysis to obtain a set of possible answers and narrow this set to fewer (or one) answer provided to back to client 182. This mapping is possible without requiring natural language processing, which typically translates the user's language directly into database queries. Such a translation results in a set of queries that can target a data space that is narrower than desired and only marginally relevant to the user's questions.

For example, suppose a user of client 182 wishes to answer the natural language question "Where have we experienced a decline in diversity this quarter in our company?" Previously, the measures corresponding to this question were annotated at 202. For example, the measure "diversity" may have been annotated with the expression for calculating the diversity based on information for each employee of each department of the company. In addition, the hierarchy of locations (departments, sites, regions, company) for the dimension "location" may have been defined. Further, a template for the question "Where have we experienced a change in diversity this quarter in our company?" would have been provided at 204. The template may be configurable, to allow users of clients 182 to track trends in different aspects of the company. For example, the template "Where have we experienced {{trend_change}} in {{measure1}} in the {{measure/time period}}?" may correspond to the question. In addition to defining the template, routines for calculating changes in measures as well as other information may have been determined and stored at 204. Thus, the routine trend_change may be created and stored. The queries, such as SQL queries to interrogate dataset 152 to determine diversity at each time period has also been obtained.

The question is received at 206. The corresponding template provided at 204 "Where experienced {{trend_change}} in {{measure1}} by {{measure/time period}} ?" is found at 208. Also at 208, "diversity" is mapped to {{measure1}}, "quarter" is mapped to {{measure/time period}} and "change" is mapped to queries to determine diversity in both the previous and current quarters and to the routine {{trend_change}}, which reviews the diversity and determines whether an increase or decrease is found. The "where" in the template is mapped to the location dimension in this embodiment. In other embodiments, the "where" might refer to a more abstract cluster determined by analyzing location, job levels, job categories, tenure cohorts, etc. So the answer to the question above might come in the form of 'in management positions with tenure >7 years'. The algorithm that determines the right answer (the right element of the right dimension) is correspondingly more complex. Because dataset 152 was annotated, the hierarchy of locations is known. Thus, the queries for the template iterate through the locations to determine diversity for the past and present quarter for all locations. The routine(s) for trend_change, expression (formula for calculating the measure) for diversity, and location information such as departments are also accessed at 208. This information is provided to engine 170.

Based on this mapping, engine 170 can access the appropriate measures and dimensions to determine diversities for each quarter for the locations of the company. The data space investigated by the question has been reduced by limiting the time periods to the past and current quarters. If desired, the data space might have been further reduced by specifying specific departments at which diversity is to be investigated. The diversities for the locations and quarters are determined by querying dataset 152. Using the trend_change routine, engine 170 compares the diversity for each quarter for each location to determine whether diversity has declined significantly in any location. Thus, the locations at which diversity has declined have been determined. The answer may be further filtered to return as part of the answer only departments in a particular city in which diversity is decreasing or only departments in which diversity is decreasing by at least a particular amount. Engine 170 can reduce the number of answers by detecting which ones are just different manifestations of the same problem. For example: If diversity is decreasing for the whole department, this will manifest as decrease in diversity in various management levels in the department, but all these answers are related to one root cause. In some embodiments, some explanation for the reduction in diversity may be provided. For example, statistics regarding the loss of employees having particular dimensions related to diversity may be provided. In addition, a sentiment (attribute) associated with the change in the measure diversity may be returned. A reduction in diversity may result in a negative sentiment being provided to users of client 182. In addition, information for dimensions related to diversity and having an "explanation only" category might be provided to the user to indicate reasons why diversity may have changed in a particular manner.

Thus, using method 200, dataset 152 may be annotated. Relevant questions and templates may also be provided for users of clients 182. When received, the questions may be automatically translated to measures, dimensions, attributes, queries and routines used in querying dataset 152. This is possible without the use of natural language processing, which can provide a set of database queries not pertinent to the user's questions. Consequently, method 200 improves the efficiency of a database system by automatically generating relevant, targeted database queries that efficiently address user questions. Further, the possible answers to the questions may be managed to reduce, rank, provide possible explanations of and/or otherwise make the answers to the question more understandable to users. Method 200 thus further enhances the efficiency of a database system by more efficiently computing results and narrowing final results to those that that better address user questions. As a result, a user having limited expertise in formulating database queries or in particular aspects of the organization may still obtain meaningful answers. Use of dataset 152 may provide improved information while involving less time and fewer other resources. Consequently, performance of system 150 may be improved.

Figure 3:
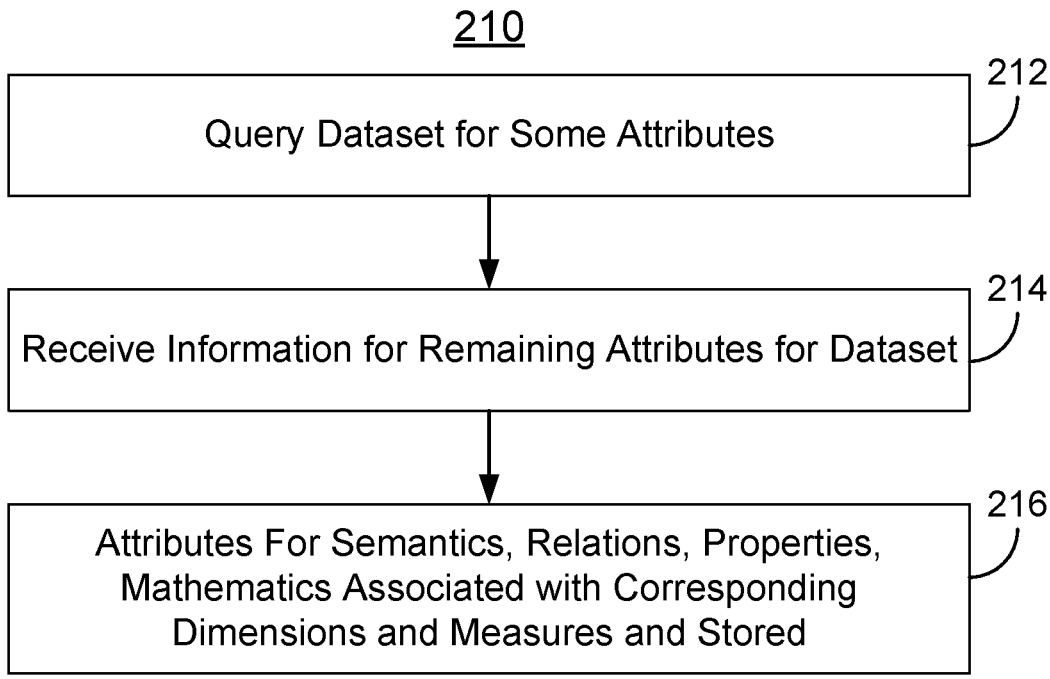
FIG. 3 is a flow chart depicting an exemplary embodiment of a method for annotating a dataset with attributes and mapping a question corresponding to the attributes.

FIG. 3 is a flow chart depicting an exemplary embodiment of method 210 for annotating a dataset with attributes. Method 210 may be performed using processor(s) 102 executing instructions from memory 110. Method 210 is described in the context of the system 150. However, method 210 may be executed using another system. Method 210 may be used in performing step 202 of method 200.

Dataset 152 is optionally queried to obtain some of the attributes for dataset 152, at 212. For example, system 150 may automatically detect which portions of dataset 152 (e.g. columns) are dimensions and which are measures. The hierarchy between certain dimensions may also be determined at 212. The column corresponding to the date and time period for dataset 152 can also be automatically determined. Columns that contain identification strings may also be matched to the column containing descriptive names for the identifications. In some embodiments, certain attributes that are common to multiple organizations, and thus multiple datasets 152, may also be determined. For example, semantic types such as region and currency may be detected at 152. Mathematic attributes may be determined by running queries on dataset 152 and comparing the result to what is expected for symmetric or additive measures. At least some relations between measures may also be discovered. Thus, configuration of dataset 152 may be somewhat simplified by carrying out portions of the annotation automatically.

Information related to remaining attributes for the dimensions and measures of dataset 152 is received, at 214. This information may be provided by user(s) of client(s) 180, such as the creator of dataset 152 and/or analyst(s) for the organization relating to dataset 152. For example, the creator of dataset 152 may specify the mathematic attributes of portions of the dataset not determined at 212. The analyst may identify attributes, such as the business properties, that are pertinent to the activities of users of dataset 152. For example, the analyst may designate the sentiment (positive, negative, neutral) for changes in particular measures. The analyst may also identify which measures are suitable-for-leaderboard based on their knowledge of which portions of dataset 152 are important for specific goals (e.g. reducing cost). The analyst may also define which dimensions are explanation only. For example, currency value may be identified as an explanation only for changes in revenue. Thus, various attributes may be selected based upon dataset 152 and the context (e.g. organization) in which questions are desired to be answered using dataset 152.

The attributes identified at 214 are associated with the corresponding measures and dimensions and stored, at 216. At 216 the attributes may be stored in attribute annotation 162 of semantics module 160. Consequently, dataset 152 is annotated with attributes appropriate for answering questions of users of clients 182.

Figure 4:
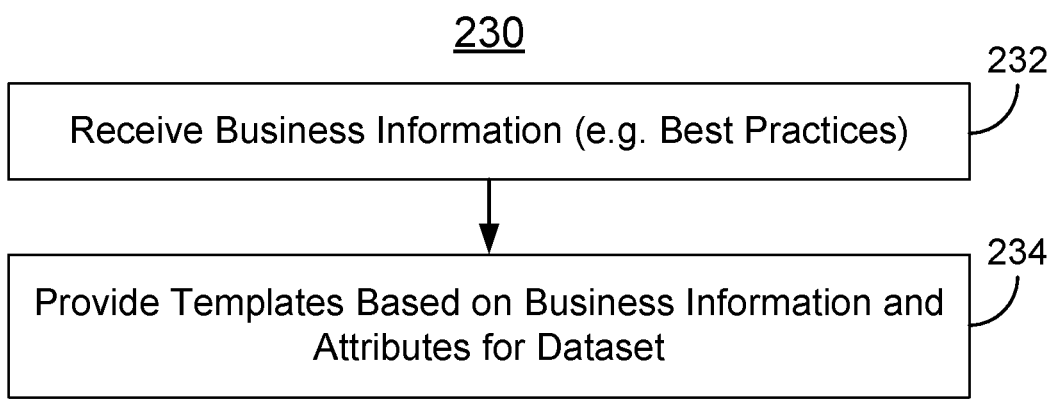
FIG. 4 is a flow chart depicting an exemplary embodiment of a method for providing templates for questions based upon attributes.

FIG. 4 is a flow chart depicting an exemplary embodiment of method 230 for providing templates for questions based upon attributes. Method 230 may be performed using processor(s) 102 executing instructions from memory 110. Method 230 is described in the context of the system 150. However, method 230 may be executed using another system. Method 230 may be used in performing step 204 of method 200.

Business information is received, at 232. In some embodiments, a user such as an analyst of client 180 may provide the information at 232. The information received may include best practices specific to the industry with which dataset 152 is to be used. General best practice information might also be received. Other information such as goals of the organization, particular trends or issues that may be of interest and similar data may be received at 232.

The templates for the questions are built based on such information, at 234. Analysts or other individuals with the appropriate expertise, for example with programming, statistics and/or SQL queries, may create not only the templates, but the queries/routines to which questions are mapped. For example, a template provided at 234 might be "Where is {{measure1}} {{pattern1}} compared to {{measure/benchmark}}?" This template may be used to provide configurable questions in which measure1, pattern1 and measure/benchmark may be selected by user. The patterns, measures and dimensions selectable by the user may also be limited as part of providing the template. Thus, the pattern1 may be selected from an appropriate comparative pattern, such as falling, rising or changing. In some cases, the queries that will provide data for any routines are built in engine 170 and may not need to be specified. In other embodiments, the queries for such patterns are also provided at 234. For example, the desired routine and SQL queries may be created or associated with pattern1. The measure/benchmark allowed to be used with the template may also be defined at 234. For example, the user may be allowed to enter a time period (e.g. last month, last year, last quarter), specific data for the organization (e.g. company average, company plan) or the industry of which the organization is a part (e.g. industry benchmark). Thus, the template that may be configured or selected by uses of clients 182 to form natural language questions may be provided. Using a single template provided at 234, a number of questions may be provided for users of clients 182.

Figure 5:
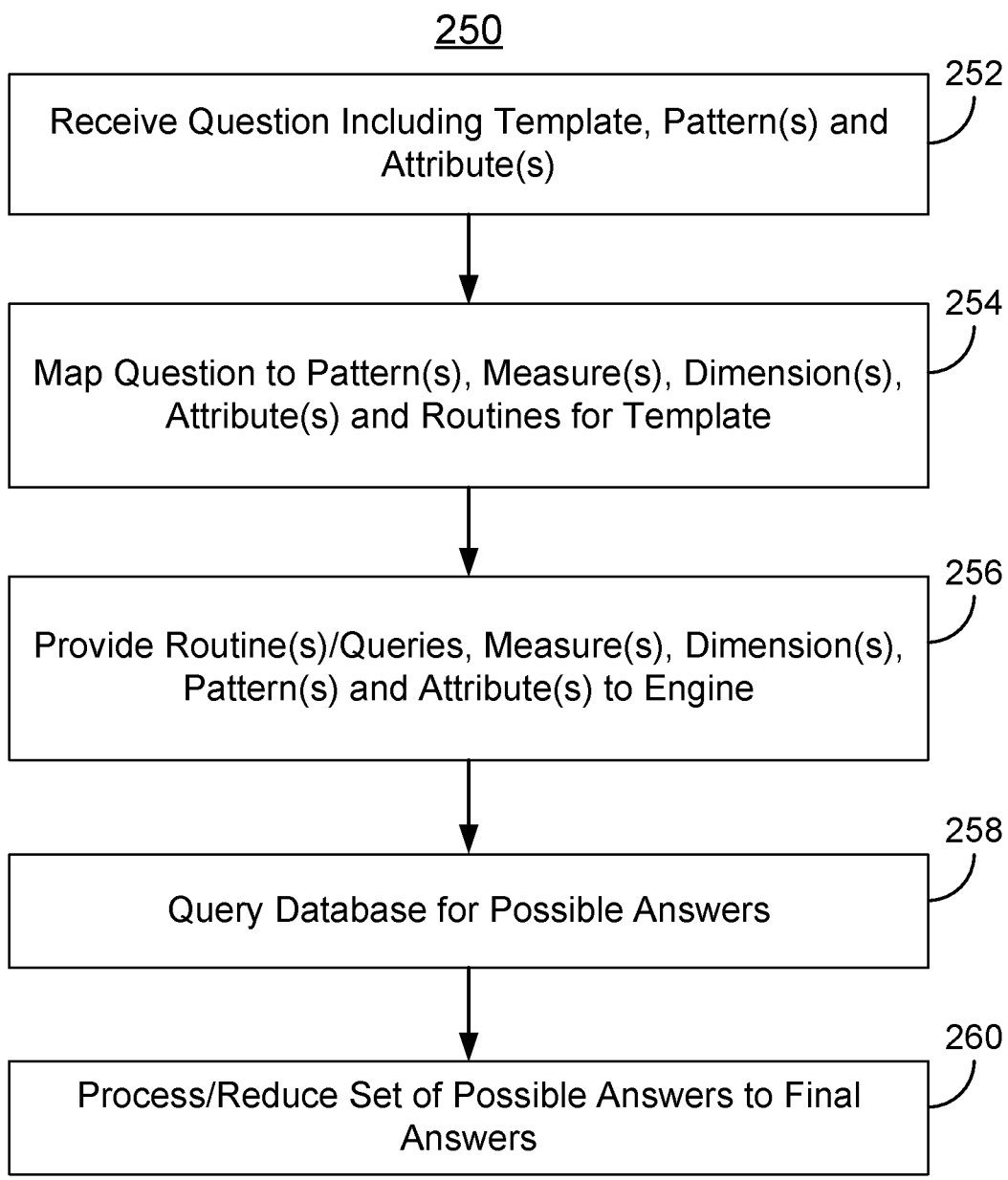
FIG. 5 is a flow chart depicting an exemplary embodiment of a method for mapping a question to queries based on templates and attributes.

FIG. 5 is a flow chart depicting an exemplary embodiment of method 250 for mapping a question to queries based on templates and attributes. Method 250 may be performed using processor(s) 102 executing instructions from memory 110. Method 250 is described in the context of the system 150. However, method 250 may be executed using another system. Method 230 may be used in performing steps 206 and 208 of method 200.

A question including a template having patterns, attribute(s), measure(s) and/or dimensions is received, at 252. For example, a user of client 180 may pose one of the questions described above by selecting a preset question or configuring a question from a template. The user may also select the question based on an automated suggestion, such as popularity with other (similar) users (based on the user's job position, tenure, seniority level, responsibility, security, authorization and other characteristics), whether within his company or cross-company.

Because the question includes a template, the question can be mapped to the pattern(s), measure(s), dimension(s) and attribute(s) identified in or associated with the question, at 254. Further, the SQL queries and other routines associated with the template are also obtained at 254. These are provided to engine 170 at 256. Thus, engine 170 understands the extent of the space (portion of dataset 152) to be queried based on the attributes, the queries to be provided to dataset 152 and additional analysis to be performed. Dataset 152 is queried by engine 170 at 258 and possible answers returned. The mapping can also be inferred (or suggested) in an automated manner, based on existing mapping of other questions.

The number of answers returned may include answers of reduced importance and other answers desired to be eliminated before presentation to the user. Thus, engine 170 processes the set of possible answers using module 176 to select the final answers to be provided to the user, at 260. Processing may include ranking, combining, weighting, filtering and/or otherwise performing analytics on possible answers or their relationships to obtain final answer(s). Such analytics might include, for example, graph analysis, relational analysis, clustering, dimensionality reduction, and causation analysis. Also, previous feedback from users (such as liking or disliking an answer with particular characteristics or related to particular dimensions or elements) may be taken into account in 176. The answers may include explanations, such as the identification of particular individuals having responsibilities for certain measures, dimensions that happen to be part of an explanation or dimensions that have attributes indicating the dimensions are for explanation only. Thus, ranked final answers and explanations may be provided to the user. As a result, extraction of meaning from dataset may be improved.

Thus, using methods 210, 230 and 250, dataset 152 may be annotated. Relevant questions and templates may also be provided for users of clients 182. When received, the questions may be translated to the underlying templates, measures, dimensions, attributes and routines used in querying dataset 152. This is an improvement over natural language processing, which can result in the use of database queries not relevant to the user's questions. Further, the possible answers to the questions may be managed to reduce, rank, provide possible explanations of and/or otherwise make the answers to the question more understandable to users. This further enhances the efficacy of a database system by more efficiently computing results and narrowing final results to those that that better address user questions. As a result, a user having limited expertise in formulating database queries or in particular aspects of the organization or industry may still obtain meaningful answers. Use of dataset 152 may provide improved information while involving less time and fewer other resources.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    annotating, using a processor, a dataset with a plurality of attributes in a plurality of predefined categories;
    providing, using the processor, a plurality of question templates based on the plurality of attributes, wherein each question template of the plurality of question templates corresponds to at least one query for the dataset;
    receiving a question including: a question template selected from the plurality of question templates;
    mapping, using the processor, the question to at least one attribute of the plurality of attributes in the plurality of predefined categories and at least one pattern for the at least one attribute, wherein the at least one pattern includes a relationship for the data of the dataset, and wherein the mapping of the question comprises:
        mapping the question to an attribute and a pattern indicated in the question template;
    providing, using the processor, at least one query for the dataset, the at least one query being based on the at least one pattern and the at least one attribute, wherein the providing of the at least one query for the dataset comprises:
        accessing a portion of the dataset to obtain a set of possible answers; and
    determining a response to the question based on the set of possible answers.

2. The method of claim 1, wherein annotating further includes:
    associating a first portion of the plurality of attributes with dimensions of the dataset; and
    associating a second portion of the plurality of attributes with measures of the dataset.

3. The method of claim 2, wherein the plurality of predefined categories includes semantics, relations, properties and mathematics.

4. The method of claim 3, wherein the first portion of the plurality of attributes include explanation-only, explain-by-subset and responsibility for the properties, dimensional type for the semantics and hierarchical relationship for the relations; and
    wherein the second portion of the attributes includes suitable, expression-of-measure, sentiment and dimension-limitation for the properties, measure type for the semantics, symmetricity and additivity for the mathematics and measure-relationship for the relations.

5. The method of claim 1, wherein the providing the plurality of question templates includes:
    receiving a plurality of best-practices;
    determining the at least one query based on the plurality of best practices and the plurality of attributes.

6. The method of claim 1, wherein the annotating further includes:

querying the dataset to determine a plurality of characteristics for a portion of the dataset; and
mapping a portion of the plurality of attributes to the portion of the dataset based on the plurality of characteristics.

7. The method of claim 1, wherein the annotating further includes:
receiving a correspondence between at least a portion of the plurality of attributes and a portion of the dataset.

8. The method of claim 1, wherein the plurality of question templates includes a plurality of predetermined questions.

9. A system, comprising:
a processor configured to:
annotate a dataset with a plurality of attributes in a plurality of predefined categories;
provide a plurality of question templates based on the plurality of attributes, wherein each question template of the plurality of question templates corresponds to at least one query for the dataset;
receive a question including: a question template selected from the plurality question templates;
map the question to at least one attribute of the plurality of attributes in the plurality of predefined categories and at least one pattern for the at least one attribute, wherein the at least one pattern includes a relationship for the data of the dataset, and wherein the mapping of the question comprises to:
map the question to an attribute and a pattern indicated in the question template;
provide at least one query for the dataset, the at least one query being based on the at least one pattern and the at least one attribute, wherein the providing of the at least one query for the dataset comprises to:
access a portion of the dataset to obtain a set of possible answers; and
determine a response to the question based on the set of possible answers; and
a memory coupled to the processor and configured to provide the processor with instructions.

10. The system of claim 9, wherein to annotate the dataset, the processor is further configured to:
associate a first portion of the plurality of attributes with dimensions of the dataset; and
associate a second portion of the plurality of attributes with measures of the dataset.

11. The system of claim 10, wherein the plurality of predefined categories includes semantics, relations, properties and mathematics.

12. The system of claim 11, wherein the first portion of the plurality of attributes includes explanation-only, explain-by-subset and responsibility for the properties, dimensional type for the semantics and hierarchical relationship for the relations; and
wherein the second portion of the attributes includes suitable-for-leaderboard, expression, sentiment and dimension-limitation for the properties, measure type for the semantics, symmetricity and additivity for the mathematics and measure-relationship for the relations.

13. The system of claim 9, wherein to provide the plurality of question templates the processor is further configured to:
receive a plurality of best-practices; and
determine the at least one query based on the plurality of best practices and the plurality of attributes.

14. The system of claim 9, wherein to annotate the dataset, the processor is further configured to:
query the dataset to determine a plurality of characteristics for a portion of the dataset; and
map a portion of the plurality of attributes to the portion of the dataset based on the plurality of characteristics.

15. The system of claim 9, wherein to annotate the dataset, the process is further configured to:
receive a correspondence between at least a portion of the plurality of attributes and a portion of the dataset.

16. The system of claim 9, wherein the plurality of question templates includes a plurality of predetermined questions.

17. A computer program product comprising a non-transitory computer readable storage medium and comprising computer instructions for
annotating, using a processor, a dataset with a plurality of attributes in a plurality of predefined categories;
providing, using the processor, a plurality of question templates based on the plurality of attributes, wherein each question template of the plurality of question templates corresponds to at least one query for the dataset;
receiving a question including: a question template selected from the plurality of question templates;
mapping, using the processor, the question to at least one attribute of the plurality of attributes in the plurality of predefined categories and at least one pattern for the at least one attribute, wherein the at least one pattern includes a relationship for the data of the dataset, and wherein the mapping of the question comprises:
mapping the question to an attribute and a pattern indicated in the question template;
providing, using the processor, at least one query for the dataset, the at least one query being based on the at least one pattern and the at least one attribute, wherein the providing of the at least one query for the dataset comprises:
accessing a portion of the dataset to obtain a set of possible answers; and
determining a response to the question based on the set of possible answers.

18. The computer-program product of claim 17, wherein annotating further includes:
associating a first portion of the plurality of attributes with dimensions of the dataset; and
associating a second portion of the plurality of attributes with measures of the dataset.

19. The computer-program product of claim 17, wherein the annotating further includes:
querying the dataset to determine a plurality of characteristics for a portion of the dataset; and
mapping a portion of the plurality of attributes to the portion of the dataset based on the plurality of characteristics.

20. The computer-program product of claim 17, wherein the annotating further includes:
receiving a correspondence between at least a portion of the plurality of attributes and a portion of the dataset.

21. The computer-program product of claim 17, wherein the plurality of question templates includes a plurality of predetermined questions.

* * * * *